(12) United States Patent
Moon et al.

(10) Patent No.: US 8,509,595 B2
(45) Date of Patent: Aug. 13, 2013

(54) INFORMATION STORAGE MEDIUM STORING MULTI ANGLE DATA, AND RECORDING METHOD AND REPRODUCING APPARATUS THEREOF

(75) Inventors: Seong-jin Moon, Suwon-si (KR);
Kil-Soo Jung, Gyeonggi-do (KR);
Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 12/339,139

(22) Filed: Dec. 19, 2008

(65) Prior Publication Data

US 2009/0123129 A1 May 14, 2009

Related U.S. Application Data

(60) Division of application No. 10/969,880, filed on Oct. 22, 2004, which is a continuation of application No. 10/885,130, filed on Jul. 7, 2004, now Pat. No. 7,493,019.

(60) Provisional application No. 60/484,672, filed on Jul. 7, 2003.

(30) Foreign Application Priority Data

Oct. 29, 2003 (KR) ................................ 2003-75825
Apr. 2, 2004 (KR) ................................ 2004-22878

(51) Int. Cl.
*H04N 9/80* (2006.01)

(52) U.S. Cl.
USPC ........................................ 386/248

(58) Field of Classification Search
USPC ................. 386/223, 248, 330, 341, 343, 344, 386/351, 353, 355, 356
See application file for complete search history.

(56) References Cited

U.S. PATENT DOCUMENTS 5,825,727 A  10/1998  Han
6,006,004 A  12/1999  Moriyama et al.
(Continued)

FOREIGN PATENT DOCUMENTS

CN  1167311  12/1997
CN  1297307  5/2001
(Continued)

OTHER PUBLICATIONS

Author: T. Tohara, J. Rice, Z. Vella, H.Nakajo. Title: An Innovated DVD Multi-Angle Content and a Desired DVD Player Date: Jan. 2006. Publisher; IEEE. Volume: Consumer Electronics, 2006. ICCE'06. 2006 Digest of Technical papers. pp. 171-172.*

(Continued)

*Primary Examiner* — Tat Chio
(74) *Attorney, Agent, or Firm* — NSIP Law

(57) ABSTRACT

An information storage medium for storing multi angle data, and a recording method and a reproducing apparatus thereof. The information storage medium stores data for a plurality of angles of a scene in interleaved blocks. Sizes of the interleaved blocks are integral multiples of sizes of integral numbered aligned units that include packets. Angle change points are included in each of the interleaved blocks which allows a reproducing apparatus to seamlessly jump from one angle to another angle during reproduction of the multi angle data. A number of the angle points recorded on the information storage medium is computed so that a jumping distance required by the data during reproduction does not exceed a maximum jumping distance of a reproducing apparatus.

2 Claims, 6 Drawing Sheets

(56) References Cited

U.S. PATENT DOCUMENTS

| | | | |
|---|---|---|---|
| 6,031,962 A * | 2/2000 | Sawabe et al. | 386/239 |
| 6,181,872 B1 * | 1/2001 | Yamane et al. | 386/332 |
| 6,341,330 B1 | 1/2002 | deCarmo | |
| 6,415,101 B1 | 7/2002 | deCarmo et al. | |
| 6,502,198 B2 | 12/2002 | Kashiwagi et al. | |
| 7,106,946 B1 * | 9/2006 | Kato | 386/241 |
| 7,493,019 B2 * | 2/2009 | Moon et al. | 386/248 |
| 7,702,211 B2 * | 4/2010 | Moon et al. | 386/344 |
| 7,826,720 B2 | 11/2010 | Seo et al. | |
| 7,869,690 B2 | 1/2011 | Kato | |
| 2002/0015581 A1 | 2/2002 | Ando et al. | |
| 2003/0113096 A1 | 6/2003 | Taira et al. | |
| 2003/0231334 A1 | 12/2003 | Nagai et al. | |
| 2003/0235404 A1 | 12/2003 | Seo et al. | |
| 2004/0076402 A1 | 4/2004 | Jung et al. | |
| 2004/0175111 A1 * | 9/2004 | Jung et al. | 386/69 |
| 2005/0094981 A1 | 5/2005 | Moon et al. | |
| 2005/0244137 A1 | 11/2005 | Takashima et al. | |

FOREIGN PATENT DOCUMENTS

| | | |
|---|---|---|
| EP | 0 793 232 | 9/1997 |
| EP | 0 798 722 A2 | 10/1997 |
| EP | 0 814 475 A1 | 12/1997 |
| EP | 0 847 198 A1 | 6/1998 |
| EP | 1 089 571 | 4/2001 |
| JP | 10-092159 | 4/1998 |
| JP | 11-27630 | 1/1999 |
| JP | 11-110950 | 4/1999 |
| JP | 11-238362 | 8/1999 |
| JP | 2002-216460 | 8/2002 |
| JP | 4441884 B2 | 3/2010 |
| KR | 1999-63895 | 7/1999 |
| WO | WO 97/13365 | 4/1997 |
| WO | WO 2004/095834 | 11/2004 |

OTHER PUBLICATIONS

Japanese Office Action issued on Mar. 2, 2010, in corresponding Japanese Application No. 2006-518547 (8 pages).
Office Action issued in Korean Patent Application No. 2004-22878 on Jan. 27, 2006.
Chinese Office Action dated Nov. 30, 2007 of the Chinese Patent Application No. 200480002849.7.
U.S. Appl. No. 10/885,130, filed Jul. 7, 2004, Seong-jin Moon et al., Samsung Electronics Co., Ltd.
U.S. Appl. No. 10/969,880, filed Oct. 22, 2004, Seong-jin Moon et al., Samsung Electronics Co., Ltd.
U.S. Appl. No. 11/430,164, filed May 9, 2006, Seong-jin Moon et al., Samsung Electronics Co., Ltd.
U.S. Appl. No. 12/276,486, filed Nov. 24, 2008, Seong-jin Moon et al., Samsung Electronics Co., Ltd.
International Search Report and Written Opinion of the International Searching Authority issued on Oct. 21, 2004, in counterpart International Application No. PCT/KR2004/001662 (6 pages).
Japanese Office Action issued on Aug. 9, 2011, in counterpart Japanese Application No. 2010-127213 (7 pages, in Japanese, including partial English translation).
Japanese Office Action issued on Aug. 9, 2011, in counterpart Japanese Application No. 2010-127214 (8 pages, in Japanese, including partial English translation).
Japanese Office Action issued on Aug. 9, 2011, in counterpart Japanese Application No. 2010-127215 (5 pages, in Japanese, including partial English translation).
Japanese Office Action issued on Sep. 6, 2011, in counterpart Japanese Application No. 2006-518547 (11 pages, in Japanese, including partial English translation).
Japanese Office Action issued on Feb. 14, 2012, in counterpart Japanese Patent Application No. JP 2010-127213 (3 pages), with English language translations (3 pages).
Final Rejection issued on Apr. 24, 2012, in counterpart Japanese Patent Application No. 2010-127214, and English Translation thereof (8 pages).
Final Rejection issued on Apr. 3, 2012, in counterpart Japanese Patent Application No. 2010-127215, and English Translation thereof (7 pages).
Supplementary European Search Report mailed Jul. 10, 2012, issued in counterpart European Patent Application No. 04 77 4084; 4 pages.
Japanese Appeal Decision issued Jan. 15, 2013 in counterpart Japanese Patent Application No. 2010-127213 (10 pages, in Japanese).

* cited by examiner

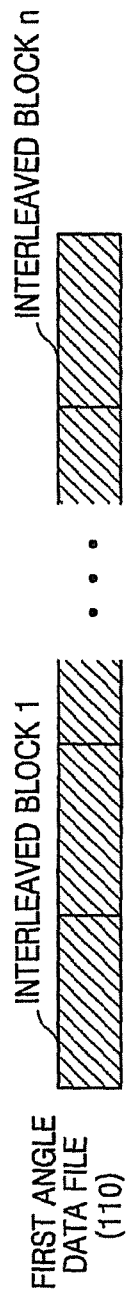
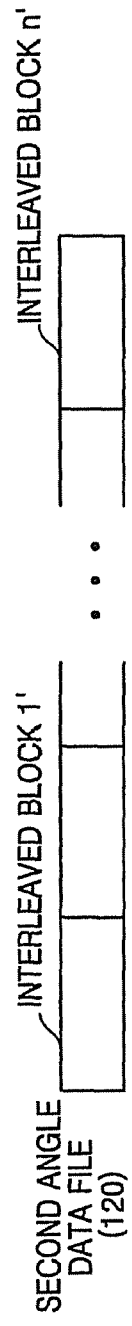
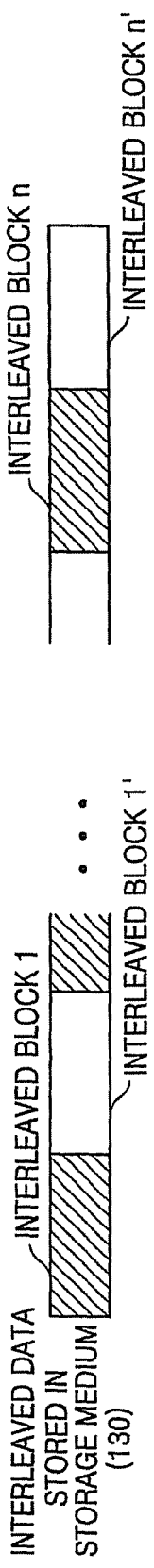

INFORMATION STORAGE MEDIUM STORING MULTI ANGLE DATA, AND RECORDING METHOD AND REPRODUCING APPARATUS THEREOF

CROSS-REFERENCE TO RELATED APPLICATIONS

This application is a division of application Ser. No. 10/969,880 filed on Oct. 22, 2004, which is a continuation of application Ser. No. 10/885,130 filed on Jul. 7, 2004, now U.S. Pat. No. 7,493,019, which claims the benefit of Korean Patent Application Nos. 2003-75825 filed on Oct. 29, 2003, and 2004-22878 filed on Apr. 2, 2004, in the Korean Intellectual Property Office, and U.S. Provisional Application No. 60/484,672 filed on Jul. 7, 2003, the disclosures of which are incorporated herein by reference.

BACKGROUND OF THE INVENTION

1. Field of the Invention

The present invention relates to multi angle data used when encoding and/or decoding video object data, and more particularly, to an information storage medium which stores the multi angle data, a method of recording and/or reproducing the multi angle data, and an apparatus for recording and/or reproducing the multi angle data.

2. Description of the Related Art

Multi angle data is obtained by photographing a scene with several cameras at different angles and encoding a result of the photographing. When a change of viewing angle of the photographed scene is desired during reproduction of contents including the multi angle data, a change of angle command is sent to a reproducing apparatus, and the reproducing apparatus reproduces data of the scene photographed at the desired angle in response to the command. For angle change, the multi angle data are divided into predetermined units and the units are alternately recorded using interleaving.

Accordingly, a pickup of the reproducing apparatus must jump to other positions so as to detect and reproduce interleaved blocks at an angle or accomplish angle change while reading the multi angle data recorded using interleaving. However, an increase in sizes of the interleaved blocks results in an increase in the distance between a current position and a position to which a pickup of the reproducing apparatus must jump for angle change. In this case, seamless reproduction is not guaranteed. On the contrary, if a size of an interleaved block is small, jumping of the pickup of the reproducing apparatus is frequently required during data reproduction that does not require angle change. Accordingly, it is important to adjust a size of an interleaved block appropriately.

Further, a jumping point allowing the reproducing apparatus to jump to other interleaved blocks at a different angle may be set within one interleaved block. In this case, a total number of jumping points must be appropriately determined so that the multi angle data is effectively reproducible.

SUMMARY OF THE INVENTION

The present invention provides an information storage medium on which multi angle data is recorded to enable seamless reproduction, and a method of recording and/or reproducing the multi-angle data and an apparatus for recording and/or reproducing the multi angle data.

The present invention also provides a method of determining a total number of angle points that allow a reproducing apparatus to jump to change reproduction positions within an interleaved block.

According to an aspect of the present invention, there is provided an information storage medium on which multi angle data comprising at least one unit of angle data is recorded, wherein the multi angle data comprises interleaved blocks, each of which includes at least one predetermined sized packet, and the data of one angle are interleaved with the data of at least one other angle in units of the interleaved blocks, sizes of the interleaved blocks being integral multiples of sizes of integral numbered aligned units that include packets.

Each of the interleaved blocks may include at least one angle point that allows a reproducing apparatus to continue data reproduction while jumping to other reproduction positions during reproduction of the angle data, a number of angle points includible in each of the interleaved blocks being integral multiples of a number of the aligned units.

According to another aspect of the present invention, there is provided a method of recording multi angle data that includes interleaved blocks, each of which includes at least one angle point that allows a reproducing apparatus to jump to other reproduction positions during data reproduction, using interleaving, the method comprising computing a distance between angle points; compensating for an offset between the computed distance and a reproduction length of a packet comprising each of the interleaved blocks; computing a maximum number of angle points in one interleaved unit that is obtained when a possible longest jumping distance to which the reproducing apparatus can jump during data reproduction is smaller than or equal to a maximum jumping distance given by the reproducing apparatus; and making interleaved blocks based on the distance between angle points and a number of angle points, and recording the multi angle data on the interleaved blocks.

According to yet another aspect of the present invention, there is provided an apparatus for reproducing multi angle data stored in interleaved blocks, each of which includes at least one angle point allowing the apparatus to jump to other reproduction positions during data reproduction, the apparatus comprising a reading unit which reads the multi angle data; and a buffer which stores the read multi angle data, wherein the multi angle data comprises interleaved blocks, each of which includes at least one predetermined sized packet, and the angle data of one angle are interleaved with angle data of at least one other angle in units of interleaved blocks, sizes of the interleaved blocks being integral multiples of sizes of integral numbered aligned units that include packets.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail exemplary embodiments thereof with reference to the attached drawings in which:

FIG. 1A illustrates a first angle data file;
FIG. 1B illustrates a second angle data file;
FIG. 1C illustrates recording of the first and second angle data files using interleaving.

DETAILED DESCRIPTION OF THE PREFERRED EMBODIMENTS

Figure 2:
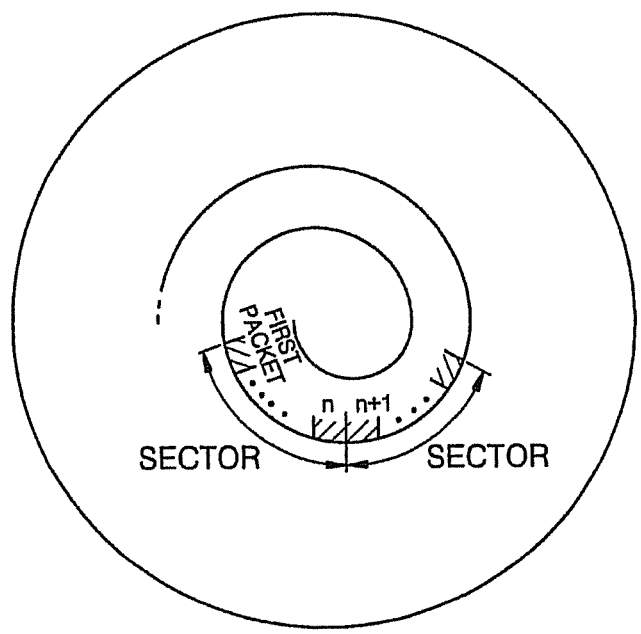
FIG. 2 illustrates the multi angle data of FIG. 1 recorded on an information storage medium.

Reference will now be made in detail to the embodiments of the present invention, examples of which are illustrated in the accompanying drawings, wherein like reference numerals refer to the like elements throughout. The embodiments are described below to explain the present invention by referring to the figures.

FIGS. 1A-1C illustrate multi angle data recorded using interleaving. The multi angle data comprises a first angle data file 110 as shown in FIG. 1A and a second angle data file 120 as shown in FIG. 1B that contain audio/video (AV) data for respective angles. The first and second angle data files 110 and 120 are alternately and continuously recorded in an area 130 of an information storage medium as shown in FIG. 1C for fast change of angle views. In other words, the first and second angle data files 110 and 120 are divided into predetermined units and the predetermined units are recorded using interleaving. Accordingly, a pickup of a reproducing apparatus is not required to move a large distance to read data at a changed angle when angle views are changed, thereby guaranteeing seamless reproduction.

Each predetermined unit of angle data included in data recorded on the information storage medium using interleaving is referred to as an extent. In the case of a digital versatile disc-video (DVD-Video), an extent is equivalent to an interleaved unit. That is, the extent indicates data recorded in a file system without a pause. Accordingly, jumping of a pickup of the reproducing apparatus to other extents is required to exactly read data for data reproduction.

FIG. 2 illustrates the interleaved data of FIGS. 1A-1C recorded on an information storage medium. An AV stream indicates a bit stream comprising a plurality of source packets. A source packet is a 192-byte packet that includes a 188 byte MPEG-2 transport stream (TS) packet and a 4-byte header. In general, data is stored in sector units in an information storage medium. A sector is a basic unit of recording a file. In general, a sector stored in a DVD is 2048 bytes long. Thus, a sector is comprised of several source packets.

Figure 3:
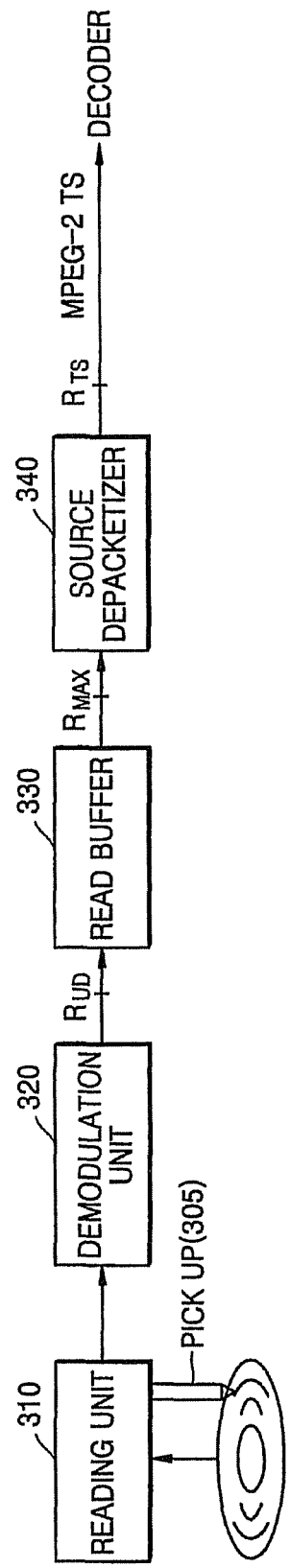
FIG. 3 is a block diagram of a reproducing apparatus for seamlessly reproducing data, according to an embodiment of the present invention.

FIG. 3 is a simplified block diagram of a reproducing apparatus for seamlessly reproducing data. Referring to FIG. 3, data stored in an information storage medium is read by a reading unit 310 and the read data is transmitted to a read buffer 330 via a demodulation unit 320. The read buffer 330 is used to buffer a bit stream that is to be transmitted to a decoder, and thus, use of the buffer guarantees seamless reproduction even during jumping of a pickup 305 in the reading unit 310. A source depacketizer 340 converts the bit stream that includes a plurality of source packets into an MPEG-2 TS packet and outputs the MPEG-2 TS packet.

Parameters related to buffering are as follows:
(a) $R_{UD}$: A data rate of data transmitted from the reading unit 310 to the read buffer 330 via the demodulation unit 320;
(b) $R_{TS}$: A maximum value of an encoding rate TS_recording_rate of an MPEG-2 TS, i.e., a speed of outputting data to the decoder; and
(c) $R_{MAX}$: A maximum bit rate of a source packet stream. An MPEG-2 TS packet is 188 bytes long and inclusion of a 4-byte header into the MPEG-2 TS packet forms a source packet stream. Therefore, a maximum bit rate $R_{MAX}$ equals $(192/188) \times R_{TS}$.

Assuming that data $B_{OCCUPIED}$ output from the read buffer 330 to the decoder at a speed TS_recording_rate satisfies Equation (1), underflow of the read buffer 330 is not caused even if data cannot further be stored in the read buffer 330 for a time $T_{JUMP}$.

$$B_{OCCUPIED} \geq \frac{T_{JUMP}(ms)}{1000} \times \frac{192}{188} \times \text{TS\_recording\_rate} \quad (1)$$

Figure 4:
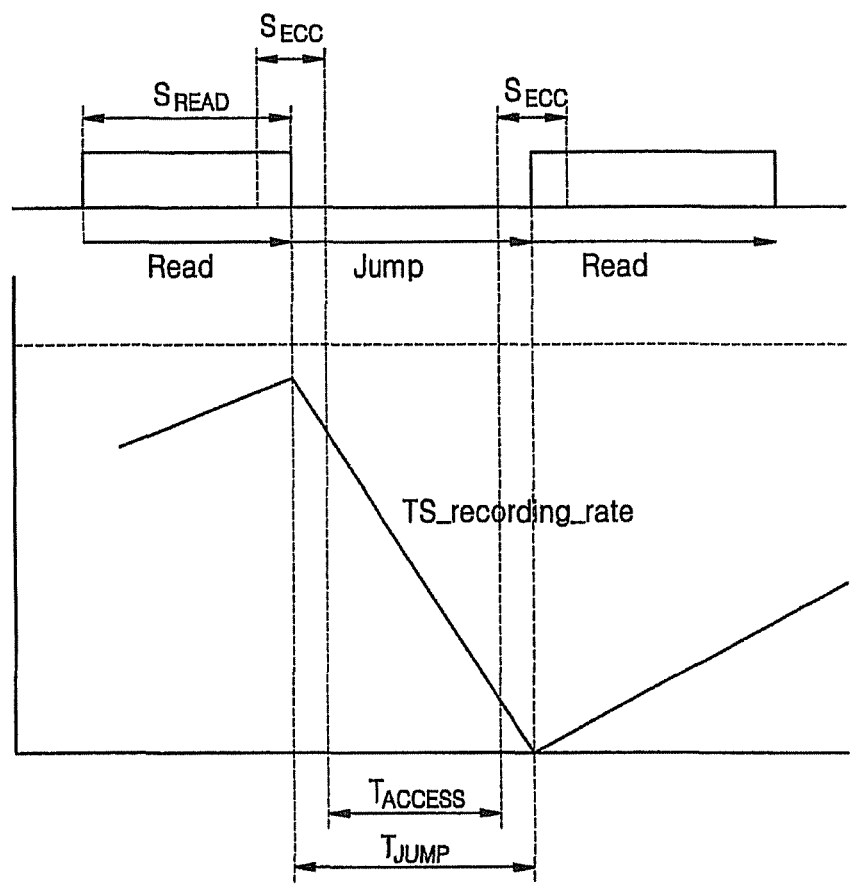
FIG. 4 is a graph illustrating an amount of data stored in a read buffer during jumping of a pickup.

FIG. 4 is a graph illustrating an amount of data stored in the read buffer 300 during jumping of the pickup 305. In FIG. 4, $T_{JUMP}$ denotes a sum of a jumping time, i.e., an access time $T_{ACCESS}$, and a time $T_{OVERHEAD}$ required to read two error correcting codes (ECCs). That is, $T_{JUMP} = T_{ACCESS} + T_{OVERHEAD}$, and $T_{OVERHEAD}$ (ms) < $\{2 \times ECC \text{ (bytes)}\}/R_{UD}$ (bps).

When reading data stored in an information storage medium, the read buffer 330 is filled with the read data. Before the pickup jumps to a new position, the read buffer 330 must be filled with data as specified in Equation (1) so as to prevent underflow of the read buffer 330. That is, in order to prevent underflow of the read buffer 330, a length $S_{READ}$ of data that must be read to the read buffer 330 before jumping of the pickup must satisfy Equation (2).

$$S_{READ}(bit) \geq \frac{T_{JUMP}(ms) \times R_{UD}}{1000} \times \frac{\text{TS\_recording\_rate}(bps) \times 192}{R_{UD}(bps) \times 188 - \text{TS\_recording\_rate}(bps) \times 192} \quad (2)$$

Figure 5:
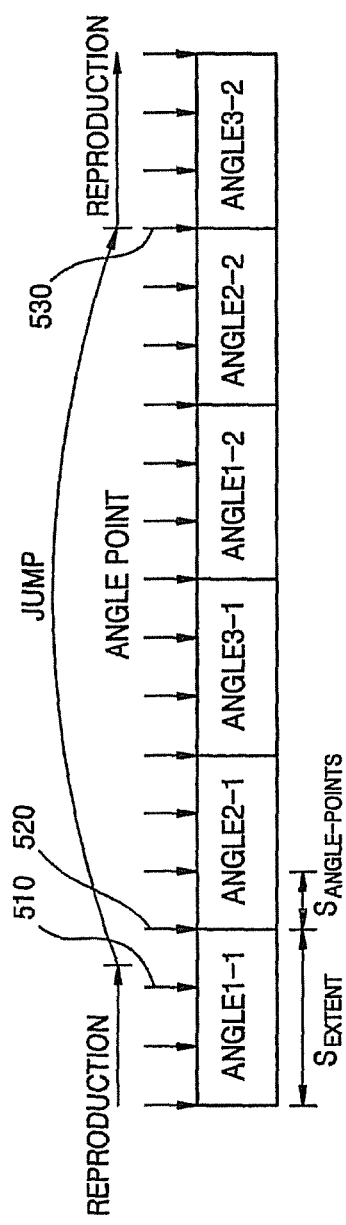
FIG. 5 illustrates a structure of a clip file recorded using interleaving to realize multi angle data, according to an embodiment of the present invention.

FIG. 5 illustrates a structure of a clip file recorded using interleaving to realize multi angle data.

As described above, respective angle data of one angle are interleaved among angle data of at least one other angle to reduce jumping time and response time for angle change, thereby seamlessly changing angles. As a result, jumping is required not only for angle change but also for normal playback at a same angle, in order to detect and reproduce desired angle data. An interleaved block is considered an extent of a clip file. An extent may include a plurality of angle points allowing a pickup to jump to other angle data. Accordingly, a length $S_{EXTENT}$ of the extent in sectors and a distance $S_{ANGLE\_POINTS}$ between two angle points must satisfy Equation (3).

$$S_{EXTENT}(sectors) = \quad (3)$$
$$INT\left\{\left(\sum_{in\_one\_extent} S_{ANGLE\_POINTS} + 6144 - 192\right) \Big/ 6144\right\} \times 3$$

The clip file of multi angle data, shown in FIG. 5, has the following restrictions:
(i) the clip file must be located on a layer;
(ii) extents of multi angle streams must start with an angle point and be aligned with aligned units. If a last aligned unit of an extent is not completely filled with input transport streams, an unoccupied space of the last aligned unit is filled with null packets;
(iii) each distance $S_{ANGLE\_POINTS}$ is an integral multiple of a length of a source packet, e.g., an integral multiple of 192 bytes; and (iv) the length $S_{EXTENT}$ of the extent, a total number of angle points in the extent, and an angle change time must meet the buffer occupancy rules defined in Equations (1) and (2). Examples of buffer parameters are shown in Tables 1 and 2 that appear below.

The distance $S_{ANGLE\_POINTS}$ between two angle points is shorter than the length $S_{EXTENT}$ of the extent, and a maximum value of the access time $T_{ACCESS}$ for angle change is obtained when jumping to a farthest angle point in a next unit of angle data from a current angle point in a current unit of angle data. A unit of angle data may be referred to as a plurality of blocks of data corresponding to a same time, wherein each block corresponds to data at a respective angle. Referring to FIG. 5, the data Angle 1-1, Angle 2-1 and Angle 3-1 may be considered to be the current unit of angle data, and the data Angle 1-2, Angle 2-2 and Angle 3-2 may be considered to be a next unit of angle data. If an angle change command is received before arriving at the angle point 520 after the angle point 510, the maximum value of the access time $T_{ACCESS}$ is obtained when jumping to a first angle point 530 of Angle 3-2 from a last angle point 520 of Angle 1-1 after reproducing remaining data of Angle 1-1.

If several angle points are set within an extent, the length $S_{READ}$ of FIG. 4 is equal to the distance $S_{ANGLE\_POINTS}$. In this case, Equation (2) may be rewritten as follows:

$$S_{ANGLE\_POINTS}(bit) \geq \frac{T_{JUMP}(ms) \times R_{UD}(bps)}{1000} \times \frac{TS\_recording\_rate(bps) \times 192}{R_{UD}(bps) \times 188 - TS\_recording\_rate(bps) \times 192}$$

Figure 6:
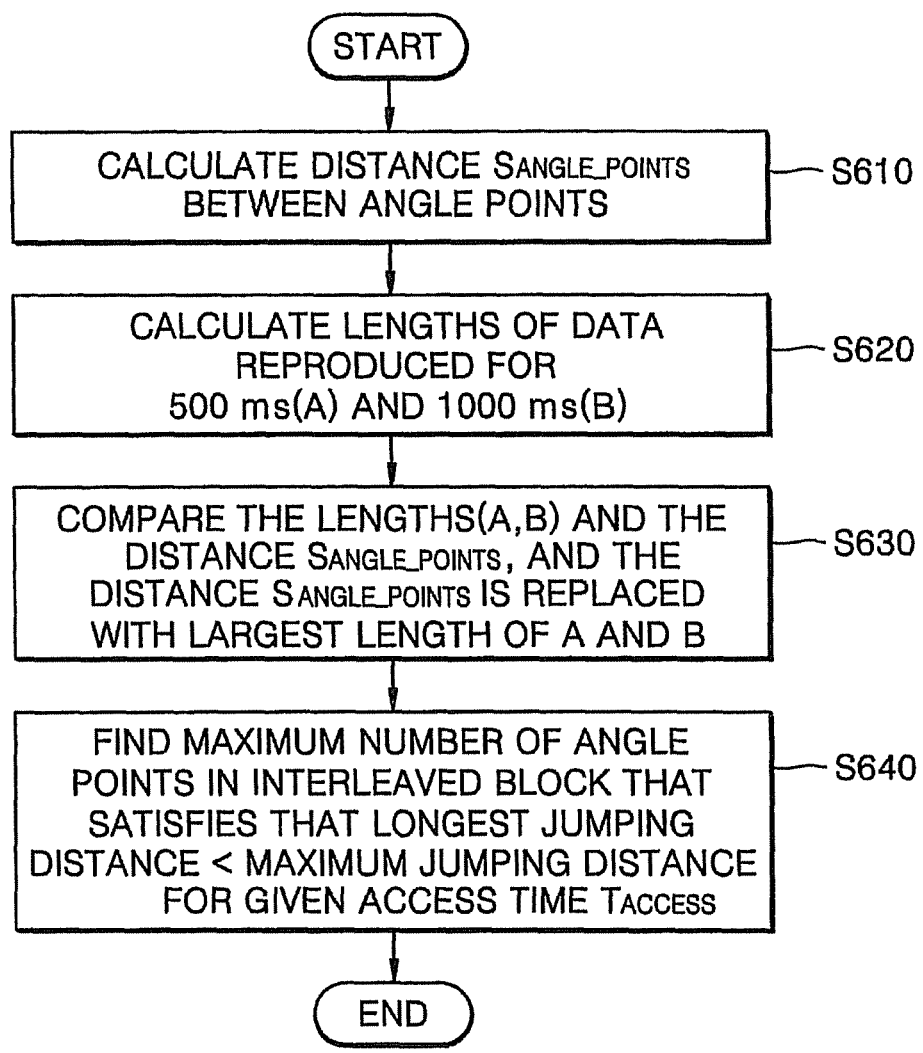
FIG. 6 is a flowchart illustrating a method of calculating the distance $S_{ANGLE\_POINTS}$ between two angle points and a length $S_{EXTENT}$ of an extent, according to an embodiment of the present invention.

FIG. 6 is a flowchart illustrating a method of calculating the distance $S_{ANGLE\_POINTS}$ between two angle points and a length $S_{EXTENT}$ of an extent, according to an embodiment of the present invention. Referring to FIG. 6, the distance $S_{ANGLE\_POINTS}$ is calculated with given access time $T_{ACCESS}$ and data output speed TS_recording_rate, using Equation (3) (S610). Next, lengths A and B of data that are reproduced at the data output speed TS_recording_rate for 500 ms and 1000 ms, respectively, are calculated (S620). Since a distance between group-of-pictures (GOPs) is between 500 ms and 1000 ms according to the MPEG-2 standards, a distance between angle points is preferably set between 500 ms and 1000 ms. Then, the distance $S_{ANGLE\_POINTS}$ is compared with the lengths A and B (S630). If the distance $S_{ANGLE\_POINTS}$<the length A, the distance $S_{ANGLE\_POINTS}$ is determined to be equal to the length A, and if the length A<the distance $S_{ANGLE\_POINTS}$ th length the distance $S_{ANGLE\_POINTS} \leq$ the length B, the distance $S_{ANGLE\_POINTS}$ is determined to be equal to the length B (S630).

Next, a maximum number M of angle points in an interleaved unit that satisfies that a longest jumping distance less than (<) a maximum jumping distance for the given access time $T_{ACCESS}$, is calculated (S640). Since the available maximum jumping distance of a reproducing apparatus is set by the reproducing apparatus, the longest jumping distance is calculated by $2 \times$(angle number $-1) \times M \times S_{ANGLE\_POINTS}$. Thus, the maximum number M can be computed using the computed longest jumping distance. Then, the length $S_{EXTENT}$ of the extent equals $INT[(M \times S_{ANGLE\_POINTS} + 6144 - 192)/6144] \times 3$ as set forth in Equation (3) above and has M angle points.

Considering that jumping is made between two angle points, angle units, each of which corresponds to data between two angle points in an angle data unit, are preferably aligned with sectors.

Tables 1 and 2 show example values of the length $S_{EXTENT}$ of an extent and the distance $S_{ANGLE\_POINTS}$ between two angle points computed using the above method. In detail, Table 1 shows example values of the length $S_{EXTENT}$ and the distance $S_{ANGLE\_POINTS}$ when a scene is photographed at three angles. Table 2 shows example values of the length $S_{EXTENT}$ and the distance $S_{ANGLE\_POINTS}$ when the scene is photographed at nine angles.

TABLE 1

| | Maximum Jump Distance | | |
|---|---|---|---|
| | 10000 sectors ($T_{ACCESS}$: 210 ms) | 20000 sectors ($T_{ACCESS}$: 270 ms) | 40000 sectors ($T_{ACCESS}$: 330 ms) |
| TS_recording_rate | $S_{EXTENT}$, and Angle Point Number and Length in $S_{EXTENT}$ | | |
| 20 Mbps | 2496, 4, 500 ms | 4989, 8, 500 ms | 9975, 8, 1 sec |
| 24 Mbps | 2247, 3, 500 ms | 4491, 3, 1 sec | 8979, 6, 1 sec |
| 30 Mbps | 1872, 1, 1 sec | 3741, 2, 1 sec | 9351, 5, 1 sec |

TABLE 2

| | Maximum Jump Distance | | |
|---|---|---|---|
| | 10000 sectors ($T_{ACCESS}$: 210 ms) | 20000 sectors ($T_{ACCESS}$: 270 ms) | 40000 sectors ($T_{ACCESS}$: 330 ms) |
| TS_recording_rate | $S_{EXTENT}$, and Angle Point Number and Length in $S_{EXTENT}$ | | |
| 20 Mbps | 624, 1, 500 ms | 1248, 2, 500 ms | 2496, 2, 1 sec |
| 24 Mbps | N.A. | N.A. | 1497, 1, 1 sec |
| 30 Mbps | N.A. | N.A. | 1872, 1, 1 sec |

In general, extents of a file are aligned with sectors. According to the present invention, a source packet is 192 bytes long and thus cannot be aligned with a sector of 2048 bytes. Therefore, three continuous sectors are grouped into an access unit. An access unit of three sectors is a minimum unit where an integral multiple of a length of a source packet is equal to a length of the access unit. In other words, where a sector has a length of 2048 bytes, a length of 32 source packets equals a length of three sectors, i.e., one access unit.

The present invention may be realized as a computer program. In this case, codes and code segments that are the members of the present invention can be easily inferred by computer programmers in the art to which the present invention belongs. Also, the computer program may be stored in a computer readable medium. When the computer program is read and executed by a computer, a method of recording a multi angle data is accomplished. The computer readable medium may be any medium, such as a magnetic recording medium, an optical recording medium, and a carrier wave medium.

As described above, according to the present invention, multi angle data is effectively recordable so that the multi angle data is seamlessly without excessive jumping of a pickup for data reproduction.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for reproducing multi angle data from an information storage medium, the method comprising:

reading the multi angle data from the information storage medium, the multi angle data comprising first angle data corresponding to a first angle and second angle data corresponding to a second angle, wherein the first angle data and the second angle data each comprise a plurality of blocks, the blocks of the first angle data are interleaved with the blocks of the second angle data, and each of the interleaved blocks comprises at least one angle point that allows a reproducing apparatus to jump from one angle point to another angle point while the reproducing apparatus is reproducing the multi angle data; and reproducing the multi angle data while jumping from one angle point to another angle point;

wherein a length of one of the interleaved blocks is determined based on a value obtained by multiplying a maximum number of angle points in the one interleaved block by a distance between a first angle point in the one interleaved block and a second angle point in the one interleaved block, there being no other angle point between the first angle point and the second angle point.

2. The method of claim 1, wherein the distance between the first angle point and the second angle point is an integral multiple of a length of a source packet of the multi angle data.

* * * * *

UNITED STATES PATENT AND TRADEMARK OFFICE
CERTIFICATE OF CORRECTION

| | | |
|---|---|---|
| PATENT NO. | : 8,509,595 B2 | |
| APPLICATION NO. | : 12/339139 | |
| DATED | : August 13, 2013 | |
| INVENTOR(S) | : Seong-jin Moon et al. | |

It is certified that error appears in the above-identified patent and that said Letters Patent is hereby corrected as shown below:

In the Claims

In Claim 1, column 8, line 2, after "medium" and before the ",", insert --with a data reading rate of a reproducing apparatus--.

In Claim 1, column 8, lines 8 - 9, delete "one angle point that allows a" and insert --two angle points that allow the--.

In Claim 1, column 8, lines 16 - 17, delete the word "maximum".

In Claim 1, column 8, line 21, after "second angle point" and before the ".", insert --and wherein the distance between the first angle point and the second angle point in the one interleaved block is based on a jumping time, the data reading rate, and a data output rate of the reproducing apparatus--.

Signed and Sealed this
Seventeenth Day of December, 2013

Margaret A. Focarino
*Commissioner for Patents of the United States Patent and Trademark Office*